Dec. 26, 1967　　　D. G. HOFFMAN　　　3,359,973
BIOLUMINESCENCE REACTION CHAMBER
Filed Feb. 23, 1965
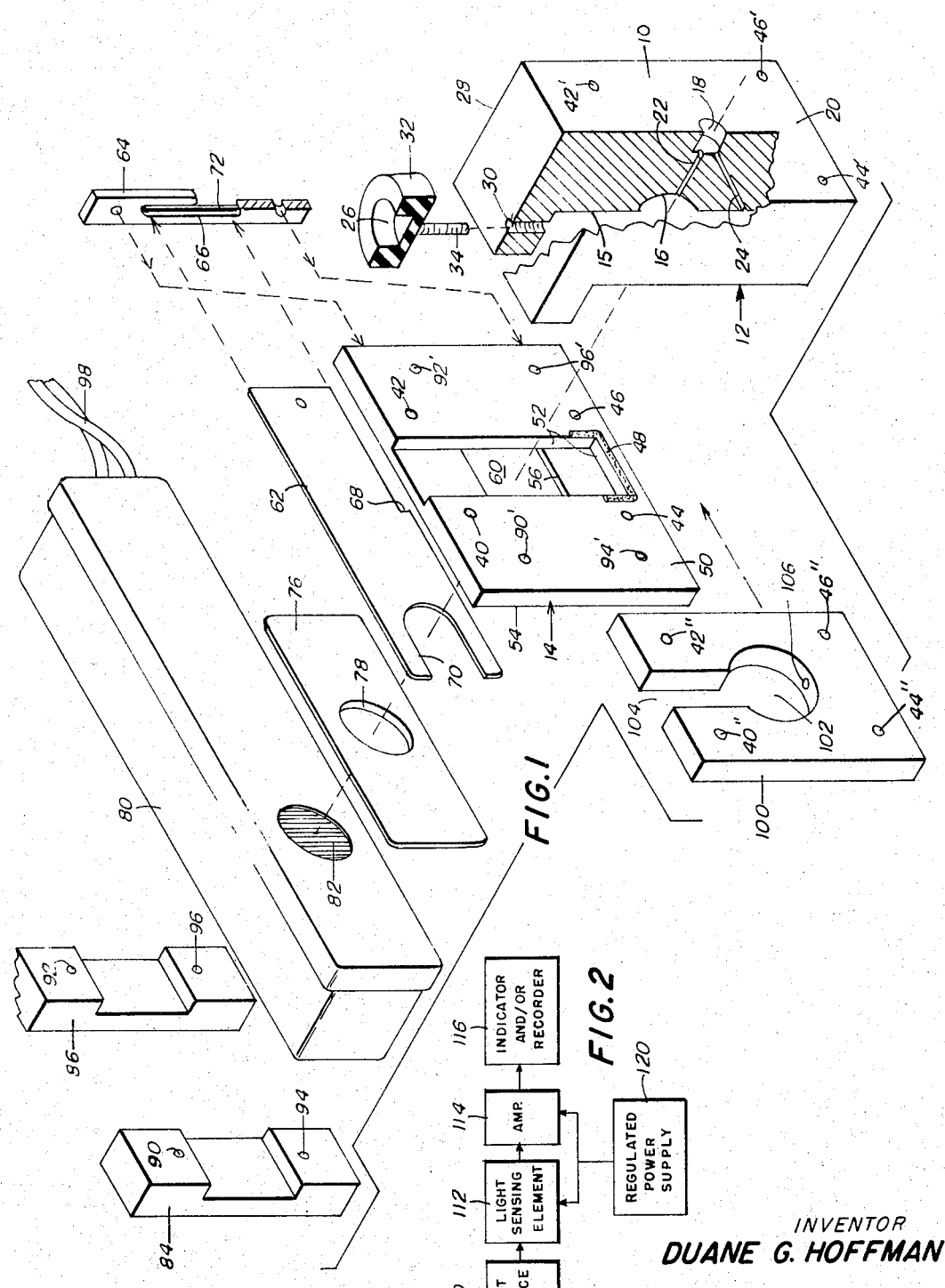
INVENTOR
DUANE G. HOFFMAN
BY *Beall and Jones*
ATTORNEYS

United States Patent Office 3,359,973
Patented Dec. 26, 1967

3,359,973
BIOLUMINESCENCE REACTION CHAMBER
Duane G. Hoffman, Fairfax, Va., assignor to Hazleton Laboratories, Incorporated, Falls Church, Va., a corporation of Virginia
Filed Feb. 23, 1965, Ser. No. 434,240
10 Claims. (Cl. 128—1)

ABSTRACT OF THE DISCLOSURE

Apparatus for testing a sample by means of a bioluminescent reaction to detect living material therein, comprising a housing forming a reaction chamber, slide or cuvette means for positioning a reactant sensitive to adenosinetriphosphate, and means for admitting a test sample into the reaction chamber for contact with the reactant. A light detector is mounted on the housing and its output, which is proportional to the light-producing reaction in the chamber, is indicative of the amount of microorganic life present in the test sample.

Field of the invention

The present invention relates to an apparatus for the detection of living material or material recently alive and, more particularly, to an apparatus for detecting and measuring light which it emitted at very low levels as the result of a bioluminescent reaction to indicate the presence of life.

Description of the prior art

Adenosinetriphosphate (ATP) is present in all forms of terrestrial life, thus making it an indicator of life at all levels of cellular organization. Much work has gone into the development of assay methods for ATP, and the sensitivity of such methods has been well developed. One such assay method involves the use of firefly lantern extracts, or the purified constituents of firefly lanterns which, when combined with ATP, will produce a bioluminescent reaction proportional to the amount of ATP present in a test sample. It has recently been discovered that not only can this bioluminescent reaction be used to determine the presence of ATP, but it may also be used as a technique for the demonstration of the presence or absence of life, establishment of the presence of invading virus in host tissues and in monitoring metabolism.

Potential applications of the bioluminescent reaction test include the rapid detection of biological warfare agents, the determination of background levels of microorganisms in air, water, food, hospital rooms and the like, the monitoring of effectiveness of sterilization procedures and sterilizing compounds, and in many other areas of research. A detailed description of the methods by which the presence of life may be detected and by which this method can be extended to other applications may be found in application Ser. No. 433,388 of J. R. Clendenning, entitled, "Method of Detecting Living Organisms"; application Ser. No. 433,361 of E. W. Chappelle and G. B. Levin, entitled, "Method for the Detection of Cancer"; and application Ser. No. 433,462 of E. W. Chappelle, entitled, "Method for the Detection of Virus"; all of which were filed on Feb. 17, 1965, and all of which are assigned to the assignee of the present application.

One of the problems involved in the use of the firefly bioluminescence reaction to detect living or recently living microorganisms is that the reaction often produces only a very low level of illumination. Further, although the reaction may often be observed visually by wearing fluoroscopic goggles and carrying out the reaction in a darkened room after a period of adaptation, it is extremely difficult to obtain anything more than a qualitative result. A further problem arises from the effect of inherent light which is produced by the firefly extract and which interferes with the detection process as low concentrations of ATP. Although this light is of a slightly different nature from that produced by the ATP reaction in that the inherent light is of longer duration, it is usually not possible for the human eye to distinguish between the inherent light and a low level ATP reaction.

Summary of the invention

It is therefore an object of the present invention to provide an apparatus for detecting and measuring the light output of a firefly bioluminescent reaction.

Another object of the invention is to provide accurate detector means which will produce an electrical signal proportional to the light output of a bioluminescent reaction.

Another object of the invention is to provide a means for detecting and recording the bioluminescent reaction of firefly lantern extract with examples of matter suspected of containing life.

Another object of the present invention is to provide a housing in which bioluminescence reactions may be observed without interference from ambient light.

An additional object of the invention is to provide a sealed chamber which includes means for mounting a supply of firefly extract and further means for inserting a test material into the extract without permitting the entrance of ambient light.

An additional object of the invention is to provide a bioluminescence reaction chamber to permit rapid and accurate testing of matter for the presence of life, the chamber including means for holding a supply reactant comprising firefly lantern extract, means for bringing test samples into contact with the reactant, and means for detecting the light produced by the resulting reaction, said chamber including means for concentrating the light produced by the reaction on the detector means.

Brief description of the drawing

Further objects and features of the invention will best be understood and appreciated from the following detailed description of a preferred embodiment thereof, selected for purposes of illustration and shown in the accompanying drawings, in which:

FIG. 1 is an exploded view in partial section of a reaction chamber constructed according to the present invention; and FIG. 2 is a schematic representation of the detecting and recording system.

Description of the preferred embodiments

Referring now to FIG. 1 of the drawings, the numeral 10 refers to the main housing of the reaction chamber constructed in accordance with the present invention. The housing is generally L-shaped, providing a recess 12 into which a mounting plate 14 may be inserted. Centrally located on the inner surface 15 of the housing, which forms a part of the recess 12, is an elipsoidal reflector 16 designed to reflect the light resulting from a bioluminescence reaction away from the main housing and toward the light detector, focusing this light on the light detector. A counterbore 18 is located on the outer surface 20 of the main housing 10 directly opposite the ellipsoidal reflector and axially aligned therewith. Injection ports 22 and 24 extend from the counterbore 18 to the surface 15 of recess 12 to permit insertion of test samples into the reaction chamber as will be further explained below. Counterbore 18 is provided with a light sealing material, such as a rubber plug, to prevent entry of ambient light into the interior of the chamber.

An additional injection port 26 is provided in the upper surface 28 of the housing 10. This injection port is adjustable and is adapted to fit into the threaded hole 30 which extends through the upper portion of the main housing and into the recess 12. Injection port 26 includes a rubber plug 32 and a threaded stem 34 which are arranged to permit insertion of test samples into the chamber without admitting ambient light. Test samples may be injected into the chamber by means of a hollow needle and a syringe, the needle piercing the rubber plug without permitting entry of light. The injection port 26 is adjusted by screwing stem 34 into hole 30 a predetermined distance so that when the injection needle is fully inserted into the port, the end of the needle will be properly positioned within the chamber. The port is adjusted for various needle lengths and for the particular position of the reactant within the chamber.

Mounting plate 14 is adapted to fit tightly against main housing 10 in the recess 12 and may be secured by means of bolts, machine screws or the like (not shown) passing through holes 40, 42, 44 and 46 in plate 14 and the corresponding holes in the main housing 10 which are indicated by primed numbers. A seal 48 of felt or some similar material may be provided between the mounting plate and main housing 10 to insure that no light can reach the interior of the chamber. The inner face 50 of mounting plate 14, which is adjacent the main housing 10, is provided with a slide cavity 52 which is designed to receive and hold glass microslides, filter paper or the like. When the mounting plate is in position against main housing 10, slide cavity 52 is aligned with the various injection ports 22, 24 and 26 to permit the addition of desired test samples to the reactant carried by the slides.

The exterior surface 54 of mounting plate 14 is provided with a slot 56 which intersects slide cavity 52 at the center of mounting plate 14 to form an opening 60 which, together with the cavity formed by the ellipsoidal reflector 16, provides a chamber in which the bioluminescent reaction can be carried out.

Adapted to fit into the horizontal slot 56 and to move back and forth therein is a sliding shutter 62. Shutter 62 is movable back and forth in slot 56 to cover and uncover the opening 60, as desired. This shutter serves to protect the light-sensing unit from ambient light when the device is disassembled to permit insertion of slides or the like in cavity 52. An end plate 64 holds the shutter in position against the mounting plate 14. The end plate 64 may be fastened to the mounting plate by means of suitable screws (not shown) and is provided with a vertical slot 66 through which the end of shutter 62 extends. Vertical slot 66 is lined with felt strip 72 to provide a light seal. Shutter 62 includes a shoulder 68 which abuts against the end plate 64 when in its open position, preventing the slide from being fully withdrawn from the mounting plate. When in this open position, the cut-out portion 70 of the slide is opposite opening 60 and permits light from the bioluminescence reaction to pass through to the detector unit.

Fitting against the outer surface 54 of the mounting plate 14 is an adapter plate 76, having a centrally located aperture 78 which is aligned with the opening 60 and the ellipsoidal reflector 16. The adapter plate provides a light-tight seal between the mounting plate and a light detector unit 80, and permits shutter 62 to move freely in slot 56. The light detector unit includes, among other things, a photo-sensitive element, such as photomultiplier tube 82, which is sensitive to light and produces an electrical signal in response to and proportional to received radiant energy. The light detector unit 80 fits tightly against the adapter plate 76 and may be held in place by means of clamps such as those indicated at 84 and 86. These clamps may be fastened to the mounting plate 14 by means of bolts, machine screws or the like which pass through holes 90, 92, 94 and 96 in the clamps and the corresponding holes indicated by corresponding primed numbers in the mounting plate provided for that purpose. The output of the light detector unit 80 may be fed by means of leads 98 to suitable indicator and/or recording means.

In the event that it is desired to utilize a cuvette in the place of glass micro-slides or filter paper, an adapter 100 is provided which fits between the mounting plate 14 and main housing 10. Cuvette adapter 100 includes an aperture 102 which receives a cuvette or other suitable container. A slot 104 extends from the aperture to the top of the adapter to provide an opening to the cuvette from injection port 26. A set screw 106 is provided at the base of the aperture 102 to permit adjustment of the height of the cuvette so that it may be properly aligned with reflector 16 and photomultiplier tube 82. Mounting holes 40", 42", 44" and 46" correspond to the mounting holes in the main housing 10, permitting adapter 100 to be quickly and accurately mounted.

The light detector unit 80 may be a Photovolt Model No. 520 photometer which uses an electron multiplier tube as the light sensing element and includes a balanced high-gain, two-stage vacuum tube amplifier. The power supply for the amplifier as well as for the multiplier is regulated to hold a constant value, providing an instrument that is relatively free of the effects of line voltage fluctuations. The multiplier tube of this particular unit has 9 stages with a spectral response compatible with the spectral quality of the light emitted during the bioluminescence reaction.

After assembling the reaction chamber by attaching the shutter 62, adapter plate 76 and light detector unit 80 to the mounting plate 14 by means of clamps 84 and 86 and suitable screws or bolts, the device is ready for use in testing cells or tissue for the presence of ATP. If a glass slide or filter paper is to be used, then these are placed in position on the mounting plate in slide cavity 52. The shutter 62 is in its closed position so that no light can reach the multiplier tube 82. The mounting plate assembly is then fastened to the main housing 10 by means of suitable screws or bolts in a light-tight relationship. If a cuvette is to be used in place of the glass slides or filter paper, then the cuvette adapter 100 is positioned between the mounting plate and the main housing, with the cuvette located in aperture 102 and adjusted so as to be centered in the opening 60 and thus aligned with the center of ellipsoidal reflector 16. Mounting plate 14 and the cuvette adapter are then fastened securely to the main housing and the device is ready for use.

With the reagents positioned in front of the multiplier tube, shutter 62 is moved to its open position and a test sample suspected of containing living matter is injected into the reaction chamber by means of a syringe and needle through one of the injection ports 22, 24 or 26. The bioluminescence resulting from the addition of the test sample impinges on the face of photomultiplier tube 82 to produce an output signal on lines 98. The highly polished reflector 16 insures that the maximum amount of emitted light will be directed toward the photomultiplier tube. The light from this reaction is in the form of a pulse which quickly reaches a maximum value and then slowly decays over a period of time. The output signal from the detector unit traces a similar waveform, the value of the electric signal representing the magnitude of the light output and corresponding to the quantity of ATP present in the sample.

In FIG. 2, the output from the light source 110, which is the firefly lantern extract, impinges on the light sensing element 112. As in the device of FIG. 1, the light sensing element may be a photomultiplier tube which produces an electric signal in response to and proportional to the light received. This electrical signal is amplified by amplifier means 114 and the resulting signal is then fed to a suitable indicator and/or recorder 116. A regulated power supply 120 is provided to insure accurate measurements. The indicator and/or recorder 116 may be an oscilloscope for visual observations combined with a camera attachment for making permanent recordings, or may be a linear recorder for producing a permanent record of the output of light source 110. The linear recorder may be a Photovolt Model 44, which is a self-balancing servo-potentiometer having suitable input and sensitivity ranges.

Amplifier 114 may include a resistance-capacitance network to reduce the signal bandwidth response of the amplifier, thus restricting the noise level and improving the detection of small signals. The amplifier may include a balancing circuit to eliminate the effects of the photomultiplier dark current, thereby permitting the use of a high-gain recorder.

Thus there has been provided an efficient, versatile yet simple reaction chamber which permits rapid and accurate testing of microorganisms under a variety of conditions and circumstances in diverse areas of microbiology. The device is extremely sensitive to the low levels of emitted light that must be detected in such testing and permits quantitative measurements of a concentration of ATP either by measuring the maximum intensity of the emitted light or by measuring the total amount of light emitted; i.e., the area under the light intensity curve, which curve decays exponentially from the maximum value. However, the scope of the invention is not limited to the specific embodiment described herein but includes the various alternatives and modifications that fall within the true spirit and scope of the invention as defined by the following claims.

What is claimed is:

1. A reaction chamber for detecting the presence of microorganisms in a test sample by means of a bioluminescent reaction comprising housing means, means for positioning within said housing a reactant sensitive to the presence of adenosinetriphosphate in a test sample, means for injecting test material into said reactant, and detector means in light-transmitting relationship with said reactant for detecting the magnitude of the bioluminescent reaction when said test sample comes into contact with said reactant.

2. The apparatus of claim 1, including means for assembling in light-tight relationship said housing means, said means for positioning a reactant and said detector means, whereby ambient light is excluded from said detector means.

3. The apparatus of claim 2, further including shutter means for interrupting the light-transmitting path between said reactant and said detector means whereby ambient light may be excluded from said detector means while said reactant is being placed in or removed from said means for positioning a reactant.

4. The apparatus of claim 1 wherein said detector means comprises photo-sensitive means for converting the radiation from said bioluminescent reaction to corresponding electric signals, said apparatus further including indicator means responsive to said electric signals.

5. The apparatus of claim 1, wherein said reactant comprises an extract of firefly lantern.

6. The apparatus of claim 1, wherein said means for injecting test material includes an adjustable injection port in said housing.

7. The apparatus of claim 3, wherein said means for positioning a reactant comprises a mounting plate having a slide cavity for holding a reactant-containing slide.

8. The apparatus of claim 3, wherein said means for positioning a reactant comprises a cuvette adapter having an aperture for holding a reactant-containing cuvette.

9. An apparatus for the detection of microorganisms by means of a bioluminescent reaction comprising a main housing portion and a mounting plate affixed to said main housing portion to form a chamber, means for positioning within said chamber a reactant of firefly lantern extract sensitive to the presence of adenosinetriphosphate in a test sample, means for injecting test material through said main housing portion into said reactant, photo-sensitive means in light-transmitting relationship with said reactant for detecting the magnitude of the bioluminescent reaction of said test sample with said reactant and producing an electrical signal in response thereto, means for positioning said photo-sensitive means in light-tight relationship with said reactant to exclude ambient light from said photo-sensitive means, and shutter means located between said reactant and said photo-sensitive means.

10. An apparatus for the detection of microorganisms as described in claim 9, further including means responsive to said electrical signal for indicating the magnitude of said bioluminescent reaction and thus for indicating the quantity of adenosinetriphosphate in said test sample, whereby the amount of microorganic life in said test sample may be determined.

References Cited

UNITED STATES PATENTS

| | | | |
|---|---|---|---|
| 947,246 | 1/1910 | Levison | 250—78 X |
| 2,398,196 | 4/1946 | Sicular | 250—78 X |
| 2,975,553 | 3/1961 | Paul | 47—1 |

RICHARD A. GAUDET, *Primary Examiner.*

SIMON BRODER, *Examiner.*